United States Patent [19]

Anderson et al.

[11] 4,288,574
[45] Sep. 8, 1981

[54] FLUORINATED PHENOXYPROPYL VINYL ETHER POLYMER

[75] Inventors: Burton C. Anderson, Wilmington, Del.; Ronald E. Uschold, West Chester, Pa.

[73] Assignee: E. I. Du Pont de Nemours and Company, Wilmington, Del.

[21] Appl. No.: 89,374

[22] Filed: Oct. 30, 1979

[51] Int. Cl.³ .................. C08F 12/16; C08F 16/00; C08F 18/00; C25B 13/00
[52] U.S. Cl. .................. 525/331; 204/252; 204/296; 260/29.6 F; 260/33.4 F; 260/33.6 F; 525/344; 525/353; 525/369; 525/378
[58] Field of Search ............... 525/369, 353, 331, 344, 525/378; 204/252, 296; 260/29.6 F, 33.4 F, 33.6 F

[56] References Cited

U.S. PATENT DOCUMENTS

| | | | |
|---|---|---|---|
| 2,861,059 | 11/1958 | Mowrey et al. | 525/369 |
| 3,467,638 | 9/1969 | Pattison . | |
| 3,547,858 | 12/1970 | Worrall | 525/369 |
| 3,739,016 | 6/1973 | Quarles | 260/473 C |
| 3,853,720 | 12/1974 | Kovach et al. | 204/98 |
| 3,853,721 | 12/1974 | Darlington et al. | 204/98 |

FOREIGN PATENT DOCUMENTS

| | | | |
|---|---|---|---|
| 2905457 | 8/1979 | Fed. Rep. of Germany | 525/369 |
| 53-116287 | 10/1978 | Japan . | |
| 53-125283 | 11/1978 | Japan . | |
| 899249 | 6/1962 | United Kingdom | 525/369 |

OTHER PUBLICATIONS

Tataurov et al. J. Gen. Chem. USSR, 37 632 (1967).
Birchall et al. J. Chem. Soc. 13 (1959).

Primary Examiner—William F. Hamrock

[57] ABSTRACT

Fluorinated phenolic polymer, process for its preparation, and use thereof, particularly in the form of a film as a membrane in an electrolytic cell, said polymer consisting essentially of recurring units of (1) $+CF_2CFX+$ wherein X in each of the recurring units is independently selected from F, Cl, R and OR wherein R is perfluoroalkyl of 1 to 4 carbon atoms and

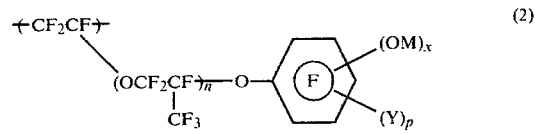

wherein Y is Cl, R or OR wherein R is perfluoroalkyl of 1 to 4 carbon atoms; M is H, alkali metal or $NR_4'$ wherein R' in each of the recurring units is independently selected from H and alkyl of 1 to 6 carbon atoms; x is an average value within the range about 0.2 to about 1.0; n is 1, 2 or 3; and p is 0 or 1, said polymer having 0 to about 21 units of (1) per unit of (2).

12 Claims, No Drawings

FLUORINATED PHENOXYPROPYL VINYL ETHER POLYMER

DESCRIPTION

1. Technical Field

This invention relates to fluorinated phenoxypropyl vinyl ether homopolymers and copolymers which are useful as membranes and ion exchange resins.

2. Background

U.S. Pat. No. 3,467,638 discloses the perfluorinated monomer of the formula

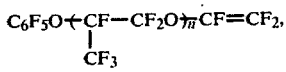

wherein n is 0, 1 or 2, and vulcanizable copolymers thereof with ethylenic monomers, preferably fluoro substituted ethylenic monomers, including tetrafluoroethylene. Japanese Publication No. J5 3125-283 (Application No. 040,607) discloses a polymeric fluorocarbon cation exchange membrane comprising a layer of dissociable -OH groups, a layer of strongly acidic sulfonic acid groups and, in addition, a layer on the surface or in the interior that contains the group

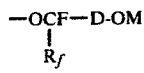

wherein $R_f$ is F or perfluoroalkyl of 1 to 5 carbon atoms, M is H, ammonium or metal, and D is

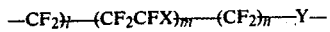

wherein X is F, Cl or H, l is 0 or 1, m is an integer of 0 to 5, n is 0 or 1, and Y is

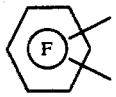

or $-CR_f^1R_f^2-$ wherein $R_f^1$ and $R_f^2$ are perfluoroaryl or perfluoroalkyl of 1 to 7 carbon atoms. Birchall et al., J. Chem. Soc., 13 (1959), disclose the preparation of pentafluorophenol from hexafluorobenzene and KOH in t-butanol. Tataurov et al., J. Gen. Chem. USSR, 37, 632 (1967), disclose the preparation of o—, m— and p-hydroxyperfluoroanisoles (11%, 7%, 82%, respectively) by treating perfluoroanisole with KOH in t-butanol. Also disclosed is the formation of monophenols from chlorotetrafluorobenzene, dichlorotrifluorobenzene or trichlorodifluoro(fluoroalkoxy)benzenes.

U.S. Pat. No. 3,853,720 discloses copolymers of fluorinated vinyl ether monomers of the formula

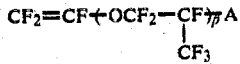

wherein p is 1 to 3 and A is $-C_6H_4OH$.

DISCLOSURE OF INVENTION

For further comprehension of the invention, and of the objects and advantages thereof, reference may be made to the following description and to the appended claims in which the various novel features of the invention are more particularly set forth.

The invention resides in the fluorinated phenolic polymer which consists essentially of recurring units of (1) $+CF_2CFX+$ wherein X in each of the recurring units is independently selected from F, Cl, R and OR wherein R is perfluoroalkyl of 1 to 4 carbon atoms and

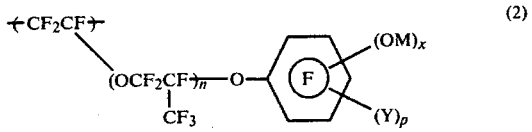

wherein Y is Cl, R or OR wherein R is perfluoroalkyl of 1 to 4 carbon atoms; M is H, alkali metal or $NR'_4$ wherein R' in each of the recurring units is independently selected from H and alkyl of 1 to 6 carbon atoms; x is an average value within the range about 0.2 to about 1.0; n is 1, 2 or 3; and p is 0 or 1, said polymer having 0 to about 21 units of (1) per unit of (2).

It is to be understood that the polymer can also include nonessential recurring units, that is, units which are not essential to the realization of the inventive features of the polymer of the invention. It is to be further understood that the polymer may hereinafter be referred to either as a homopolymer, if it contains 0 recurring units of (1) and the recurring units of (2) are provided by a single monomer, or a copolymer, if it contains recurring units of both (1) and (2) or contains 0 recurring units of (1) and a mixture of recurring units which are within the definition of (2). Finally, it is to be understood that in the copolymer containing recurring units of (1), the units may be provided by a mixture of monomers.

The polymer of this invention can be prepared from known polymers, for example, a polymer having recurring units of (1) $+CF_2CFX+$ wherein X in each of the recurring units is independently selected from F, Cl, R and OR wherein R is perfluoroalkyl of 1 to 4 carbon atoms and

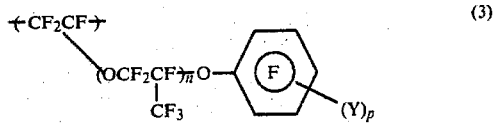

wherein Y is Cl, R or OR wherein R is perfluoroalkyl of 1 to 4 carbon atoms; n is 1, 2 3; and p is 0 or 1, said polymer having 0 21 units of (1) per unit of (3). Such a polymer and the preparation thereof is described in the art, for example, U.S. Pat. No. 3,467,638. The polymer of the invention can be obtained by contacting and reacting the aforesaid polymer of the art with a hydrolytic solution comprising about 8 to about 25 wt. %, preferably 10 to 20%, of an alkali hydroxide, about 30 to 70 wt. %, preferably 40 to 60%, of water, and the remainder, to total 100 wt. %, an organic liquid penetrant, at a temperature of about 80° C. to about 160° C. Preferably, the alkali metal hydroxide is KOH. Suitable organic liquid penetrants include dimethyl sulfoxide, diethyl sulfoxide, dimethyl sulfone, diethyl sulfone, tetrahydrothiophen-1,1-dioxide (sulfolane), and tetrahydrothiophene oxide; dimethyl sulfoxide is preferred. The reaction temperature is preferably about 90° C. to about 130° C., more preferably the reflux temperature of the hydrolytic solution. After hydrolysis, the resultant product is normally acidified with an aqueous acid, such as aqueous sulfuric acid, to convert the ionized salt moiety —O⁻M⁺ to hydroxyl —OH. The hydroxylated product is readily molded into films or other shapes. Alternatively, but less preferably, the polymer reactant can be molded before hydrolysis and then hydrolyzed in molded form, as, for example, a film.

It is believed that, in the process of this invention, introduction of the —OM moiety is effected by replacement of F atoms in the terminal fluorinated aryl group of (3) above under the hydrolysis conditions employed. Although the fluorinated aryl group contains 4 or 5 fluorine atoms per recurring unit, depending on whether p is 0 or 1, only about 0.2 to about 1.0 of the fluorine atoms are replaced by —OM groups under the conditions of the present process. In other words, x in the aforesaid formula is about 0.2 to about 1.0. Preferably, x is 0.6 to about 1.0. The hydroxylated polymer of this invention, when M is Na, has an equivalent weight, defined as the weight in grams of polymer containing one gram-equivalent of —OM groups, of about 450 to about 12,600, preferably about 700 to about 2500, more preferably about 900 to about 1700. Corresponding equivalent weights can be calculated for polymers wherein M is other than Na. Preferred copolymers herein have 0.5 to 21 units of (1) per unit of (2), an equivalent weight of about 700 to about 2500 and x in said formula is 0.6 to about 1.0. Even more preferred are copolymers having 1 to 13 units of (1) per unit of (2), an equivalent weight of about 900 to about 1700 and x in said formula is 0.6 to about 1.0.

The hydroxylated polymer of this invention wherein M is hydrogen is moldable, dyeable and, at equivalent weights in the range of about 600 to about 1700, water-wettable. The hydroxylated polymers of equivalent weight below about 600 are water-soluble.

The hydroxylated polymer can be converted reversibly to the ionizable form wherein M is alkali metal, ammonium or quaternary ammonium by treatment thereof with an appropriate metal hydroxide, aqueous ammonia or a quaternary ammonium hydroxide. In such ionizable form, polymer of equivalent weight above about 600 is useful as an ion exchange resin and can function as a membrane in a chloralkali electrolysis cell.

A preferred embodiment of the invention is the copolymer in the form of an electrolysis cell membrane. Such a membrane normally is prepared herein by molding the hydroxylated copolymer, in its acidic form, that is, where M is H in the aforesaid formula, into film of appropriate dimensions, then converting the film into its ionizable form by treatment with alkali as described above. A specific use for such an ion exchange copolymer is as a membrane in a chloralkali electrolysis cell to separate the anode and cathode portions of the cell from which chlorine and sodium hydroxide, respectively, are produced from brine flowing within the anodic portion of the cell (Example 2).

Experiment 1

This experiment shows that conditions and reagents used in the art to prepare the low molecular weight perfluorophenols reported in the literature are not useful for the preparation of the polymer of this invention. Tataurov et al., loc. cit., report the preparation of phenols from perfluoroanisole using KOH and t-butyl alcohol. As perfluoroanisole appears to represent a good model compound for tetrafluoroethylene/perfluoro(2-phenoxypropyl vinyl ether) copolymers, the procedure of Tataurov et al. was applied to unhydrolyzed copolymer. 5.6 Grams of potassium hydroxide were ground to a powder and suspended in 25 ml of t-butyl alcohol. A 0.21 g sample of the copolymer prepared in Example 2 but not hydrolyzed was added and the mixture was heated to reflux for 4 hours. The sample was washed with water and exchanged with 10% sulfuric acid on a steam bath for 1 hour and then dried in a vacuum oven at 130° C. The infrared spectrum of the product showed a sharp band at 3000 cm$^{-1}$, identical to the band assigned to C-H stretching modes in t-butyl alcohol. No OH band in the spectrum was observed. These results show that t-butyl ethers, not phenols, were formed.

In the following examples of embodiments of the invention melt flow has been used as a convenient measure of molecular weight because of the relatively low solubility of the polymers. Melt flow is defined as the weight, in grams, of polymer which flows in 10 minutes through a standard melt index orifice (ASTM D 569-59, Reapproved 1976) at 250° C. when a 5 kg force is applied. The operable melt flow range of the polymer of this invention is about 0.02 to about 500, preferably about 10 to about 250. Equivalent weights reported in the examples are as defined above.

EXAMPLE 1

A. 30 Grams of perfluoro(2-phenoxypropyl vinyl ether) was emulsified in 235 ml of distilled deoxygenated water in a high speed blender under a nitrogen atmosphere. To the emulsion, 2.0 g of ammonium perfluorooctanoate was added and the emulsion was placed in a 500 cc pressure bottle on a Parr shaker. The initiator components, consisting of 0.30 g of sodium sulfite, 0.090 g of ferrous sulfate heptahydrate, 0.070 g of citric acid and 0.40 g of ammonium persulfate, were added from concentrated stock solutions, about 5 ml of each concentrate being required to obtain the aforesaid amounts. The apparatus was then pressured to 380 kPa with tetrafluoroethylene and a constant pressure was maintained by means of a regulator. The polymerization was allowed to proceed for 23 hours at ambient temperature. During that time 6.1 g of tetrafluoroethylene was consumed and a polymer dispersion containing 6.0% solids and 13.8 g polymer was produced. The copolymer contained 55.9% by weight of perfluoro(2-phenoxypropyl vinyl ether), corresponding to about 3.2 recurring units of tetrafluoroethylene per recurring unit of the vinyl ether. The melt flow was 29.

The copolymer was isolated from the dispersion by adding 1.0 g of aluminum potassium sulfate decahydrate, dissolved in a small quantity of water, to the dispersion. The coagulated polymer was washed in a blender with three portions of water (300 ml), each containing 5 ml of concentrated hydrochloric acid, and then with three portions of distilled water. The polymer was dried in a vacuum oven at 120° C.

A 10.0 g sample of the copolymer was pressed at 150° C. into a film 0.13–0.18 mm thick. The film was placed in a flask containing a mixture consisting of 15% potassium hydroxide, 35% dimethyl sulfoxide and 50% water and heated on a steam bath for 4 hours. During the heating the film, which had been smooth and clear, became wrinkled and cloudy. The film was washed with distilled water until neutral and then treated with three portions of 10% sulfuric acid while being heated for 1 hour on a steam bath. Infrared analysis of the copolymer showed hydroxyl bands at 3800 cm$^{-1}$, indicating hydrolysis of the copolymer. A sample of the copolymer weighing 250.7 mg was placed in standard sodium hydroxide and consumed 0.100 milliequivalent of base, corresponding to an equivalent weight of 2507 for the copolymer and indicating that, on average, 30.6% of the perfluorophenyl rings were hydroxylated, that is, x in the above formula is about 0.3.

B. A tetrafluoroethylene/perfluoro(2-phenoxypropyl vinyl ether) copolymer containing 54.5% by weight perfluoro(2-phenoxypropyl vinyl ether), corresponding to about 3.4 recurring units of tetrafluoroethylene per recurring unit of the vinyl ether, was prepared according to the procedure described in Part A, except that the tetrafluoroethylene pressure was maintained at 520 kPa. A total of 26.6 g of copolymer was obtained during a 24 hour reaction time. The polymer melt flow was 240.

An 8.0 g sample of the copolymer was refluxed for 36 hours in a mixture consisting of 15% potassium hydroxide, 50% dimethyl sulfoxide and 35% water. The dark viscous reaction mass which resulted was poured into 25% sulfuric acid. The light brown solid which separated was washed in a blender with 10% hydrochloric acid and then with water. The product was dried in a vacuum oven at 120° C. to yield 4.1 g of product. A sample was pressed into a film and was treated three times with 10% sulfuric acid while being heated for 1 hour on a steam bath. It was then washed with distilled water until neutral and placed in 10% aqueous sodium chloride containing standard sodium hydroxide. The sample weighed 483.6 mg and consumed 0.628 milliequivalent of sodium hydroxide, indicating an equivalent weight of 770; the calculated equivalent weight for one —ONa group per perfluorophenyl ring is 825. Thus, x in the above formula is about 1.

EXAMPLE 2

This example demonstrates the utility of the polymer of this invention as a membrane in a chloralkali cell. Copolymer was prepared similarly to that of Example 1A by charging to a 500 ml stainless steel shaker tube an emulsion consisting of 30.0 g of perfluoro(2-phenoxypropyl vinyl ether), 2.0 g of ammonium perfluorooctanoate and 250 ml of distilled water, along with the initiator components as in Example 1A. The tube was then pressured with nitrogen to 930 kPa and vented to atmospheric pressure three times to deoxygenate its contents. Tetrafluoroethylene was then fed to the tube in increments to maintain the pressure as close to 930 kPa as practical. After 18 hours the tube was vented and 68.0 g of copolymer was isolated as described in Example 1A. The copolymer contained 40% by weight of perfluoro(2-phenoxypropyl vinyl ether), corresponding to about 6.2 recurring units of tetrafluoroethylene per recurring unit of the vinyl ether, and had a melt flow of 0.025.

A sample of 15 g of copolymer was hydrolyzed in 100 ml of a 50% dimethyl sulfoxide-water mixture containing 15 g of potassium hydroxide by refluxing for 16 hours. The product was isolated by pouring the reaction mixture into 10% sulfuric acid and collecting the solid on a filter. The copolymer was washed with additional water and dried in a vacuum oven at 140° C. Analysis indicated that the copolymer had an equivalent weight of 1540, indicating that, on average, about 70% of the perfluorophenyl rings were hydroxylated, that is, x in the above formula is about 0.7. A sample of the copolymer was pressed into a film 0.13 mm thick between sheets of Kapton ® polyimide film by heating the sample to 180° C. and applying 45,400 kg force to the ram of the hydraulic press. The film was placed in a chloralkali electrolysis cell which was operated to obtain the results tabulated below.

| Days in Operation | Current Efficiency % | Cell Voltage (Volts) | NaOH Concentration (wt. %) |
|---|---|---|---|
| 1 | 80.6 | 5.52 | 21.3 |
| 4 | 81.1 | 5.55 | 20.4 |
| 7 | 78.0 | 5.91 | 25.1 |

BEST MODE FOR CARRYING OUT THE INVENTION

Example 2 illustrates what is believed to be the best mode for carrying out the invention.

INDUSTRIAL APPLICABILITY

Polymer of equivalent weight above about 600 is useful as an ion exchange resin and can function as a membrane in a chloralkali electrolysis cell.

We claim:

1. Fluorinated phenolic polymer consisting essentially of recurring units of (1) $+CF_2CFX+$ wherein X in each of the recurring units is independently selected from F, Cl, R and OR wherein R is perfluoroalkyl of 1 to 4 carbon atoms and

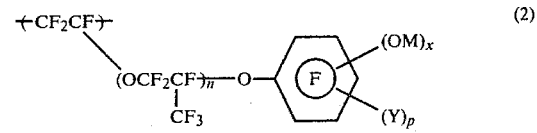

wherein Y is Cl, R or OR wherein R is perfluoroalkyl of 1 to 4 carbon atoms; M is H, alkali metal or NR$'_4$ wherein R' in each of the recurring units is independently selected from H and alkyl of 1 to 6 carbon atoms; x is an average value within the range about 0.2 to about 1.0; n is 1, 2 or 3; and p is 0 or 1, said polymer having 0 to about 21 units of (1) per unit of (2).

2. Polymer of claim 1 wherein x is 0.6 to about 1.0

3. Polymer of claim 2 having 0.5 to 21 units of (1) per unit of (2).

4. Polymer of claim 3 wherein X is F.

5. Polymer of claim 4 wherein n is 1.

6. Polymer of claim 5 wherein p is 0.

7. Polymer of claim 6 having 1 to 13 units of (1) per unit of (2).

8. Polymer of claim 3 wherein M is sodium.

9. Polymer of claim 3 in the form of a film.

10. Film of claim 9 which is used as a membrane in an electrolytic cell.

11. Film of claim 9 which is used as a membrane in a chloralkali cell.

12. Chloralkali cell wherein the membrane is the film of claim 9.

* * * * *

UNITED STATES PATENT AND TRADEMARK OFFICE
CERTIFICATE OF CORRECTION

PATENT NO. : 4,288,574
DATED : September 8, 1981
INVENTOR(S) : Burton C. Anderson and Ronald E. Uschold It is certified that error appears in the above—identified patent and that said Letters Patent is hereby corrected as shown below:

In the Abstract, line 9, "(2)" should be placed to the left of the formula in the same way that (1) appears in the Abstract, line 5;

Column 2, line 11, "(2)" should be placed to the left of the formula;

Column 2, line 48, "(3)" should be placed to the left of the formula;

Column 6, line 37, Claim 1, "(2)" should be placed to the left of the formula.

Signed and Sealed this

Tenth Day of January 1984

[SEAL]

Attest:

Attesting Officer

GERALD J. MOSSINGHOFF

Commissioner of Patents and Trademarks